US008976145B2

(12) United States Patent
Taylor et al.

(10) Patent No.: US 8,976,145 B2
(45) Date of Patent: Mar. 10, 2015

(54) REDUCTION OF NOISE AND DE-GHOSTING IN A MUTUAL CAPACITANCE MULTI-TOUCH TOUCHPAD

(75) Inventors: David C. Taylor, West Jordan, UT (US); Paul Vincent, Kaysville, UT (US); Jared G. Bytheway, Sandy, UT (US)

(73) Assignee: Cirque Corporation, Salt Lake City, UT (US)

( * ) Notice: Subject to any disclaimer, the term of this patent is extended or adjusted under 35 U.S.C. 154(b) by 270 days.

(21) Appl. No.: 13/397,527

(22) Filed: Feb. 15, 2012

(65) Prior Publication Data

US 2012/0206407 A1    Aug. 16, 2012

Related U.S. Application Data

(60) Provisional application No. 61/443,162, filed on Feb. 15, 2011.

(51) Int. Cl.
*G06F 3/044* (2006.01)
*G06F 3/041* (2006.01)

(52) U.S. Cl.
CPC ............. *G06F 3/044* (2013.01); *G06F 3/0418* (2013.01)
USPC ........................................................ 345/174

(58) Field of Classification Search
USPC ...................................... 345/174; 178/18.06
See application file for complete search history.

(56) References Cited

U.S. PATENT DOCUMENTS

| 2008/0122803 | A1 | 5/2008 | Izadi et al. |
| 2008/0158178 | A1 | 7/2008 | Hotelling et al. |
| 2008/0218494 | A1 | 9/2008 | Perski et al. |
| 2009/0174675 | A1 | 7/2009 | Gillespie et al. |
| 2010/0066692 | A1 | 3/2010 | Noguchi et al. |
| 2010/0188364 | A1 | 7/2010 | Lin et al. |
| 2011/0032210 | A1 | 2/2011 | Chou et al. |
| 2011/0050618 | A1* | 3/2011 | Murphy et al. ............... 345/174 |
| 2011/0298745 | A1* | 12/2011 | Souchkov ..................... 345/174 |

* cited by examiner

*Primary Examiner* — Seokyun Moon
*Assistant Examiner* — Peijie Shen
(74) *Attorney, Agent, or Firm* — Morriss O'Bryant Compagni, PC (57) ABSTRACT

Decreasing the cost of a touchpad by avoiding the cost of simultaneously measuring all signals from sense electrodes by using a limited number of measuring circuits to accomplish noise reduction and de-ghosting of signal data to thereby obtain the precise location of multiple fingers on a touchpad, wherein the touchpad separates the drive electrodes into groups to thereby provide a means for obtaining granular location information for de-ghosting the touchpad, and wherein overlapping measurements are made of groups of sense electrodes to obtain data that is separated in time to thereby obtain an averaged signal for each electrode and thereby reduce sensitivity to noise.

4 Claims, 10 Drawing Sheets

REDUCTION OF NOISE AND DE-GHOSTING IN A MUTUAL CAPACITANCE MULTI-TOUCH TOUCHPAD

CROSS REFERENCE TO RELATED APPLICATIONS

This document claims priority to and incorporates by reference all of the subject matter included in the provisional patent having Ser. No. 61/443,162, filed Feb. 15, 2011.

BACKGROUND OF THE INVENTION

1. Field of the Invention

This invention relates generally to touch sensor technology. Specifically, the invention is related to a method of reducing noise in a capacitive touch sensor using mutual capacitance technology to detect and track conductive objects in contact with and/or in proximity to the touch sensor, and wherein the system also includes the ability to perform de-ghosting in order to determine the actual location of the conductive objects.

2. Description of Related Art

Figure 1:
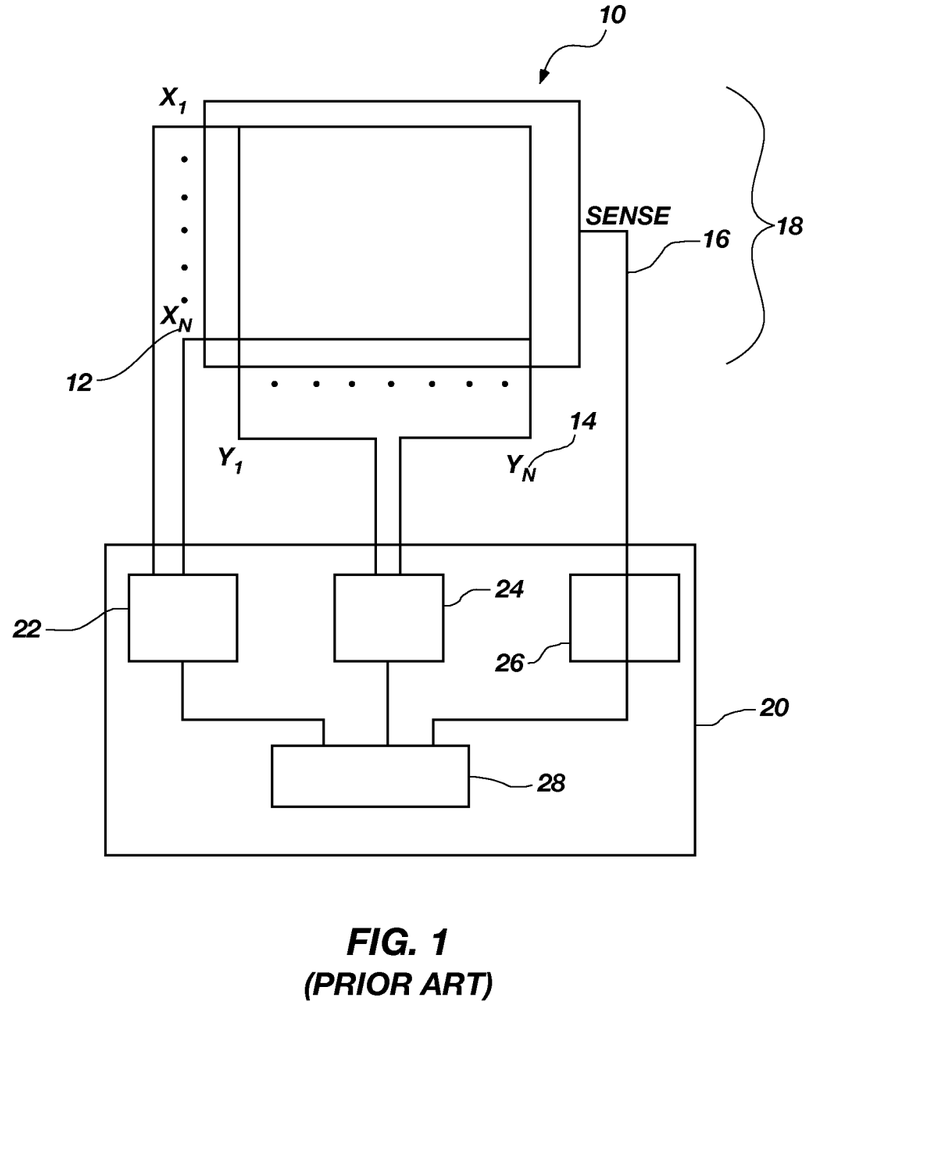
FIG. 1 is a prior art schematic diagram of a touchpad

It is useful to describe prior art touch sensor, touchpad and touchscreen technology that can be modified to use the present invention (hereinafter referred to only as "touchpad"). Specifically, the capacitance-sensitive touchpad and touchscreen technology of CIRQUE® Corporation can be modified to implement the present invention. The CIRQUE® Corporation touchpad is a mutual capacitance-sensing device and an example is illustrated in FIG. 1. The touchpad can be implemented using an opaque surface or using a transparent surface. Thus, the touchpad can be operated as a conventional touchpad or as a touch sensitive surface on a display screen, and thus as a touch screen.

In this touchpad technology of Cirque® Corporation, a grid of row and column electrodes is used to define the touch-sensitive area of the touchpad. Typically, the touchpad is a rectangular grid of approximately 16 by 12 electrodes, or 8 by 6 electrodes when there are space constraints. Interlaced with these row and column electrodes is a single sense electrode. All position measurements are made through the sense electrode. However, the row and column electrodes can also act as the sense electrode, so the important aspect is that at least one electrode is driving a signal, and at least a different electrode is used for detection of a signal.

In more detail, FIG. 1 shows a capacitance sensitive touchpad 10 as taught by CIRQUE® Corporation includes a grid of row (12) and column (14) (or X and Y) electrodes in a touchpad electrode grid. All measurements of touchpad parameters are taken from a single sense electrode 16 also disposed on the touchpad electrode grid, and not from the X or Y electrodes 12, 14. No fixed reference point is used for measurements. Touchpad sensor control circuitry 20 generates signals from P, N generators 22, 24 (positive and negative) that are sent directly to the X and Y electrodes 12, 14 in various patterns. Accordingly, there is typically a one-to-one correspondence between the number of electrodes on the touchpad electrode grid, and the number of drive pins on the touchpad sensor control circuitry 20. However, this arrangement can be modified using multiplexing of electrodes.

The touchpad 10 does not depend upon an absolute capacitive measurement to determine the location of a finger (or other capacitive object) on the touchpad surface. The touchpad 10 measures an imbalance in electrical charge to the sense line 16. When no pointing object is on the touchpad 10, the touchpad sensor control circuitry 20 is in a balanced state, and there is no signal on the sense line 16. There may or may not be a capacitive charge on the electrodes 12, 14. In the methodology of CIRQUE® Corporation, that is irrelevant. When a pointing device creates imbalance because of capacitive coupling, a change in capacitance occurs on the plurality of electrodes 12, 14 that comprise the touchpad electrode grid. What is measured is the change in capacitance, and not the absolute capacitance value on the electrodes 12, 14. The touchpad 10 determines the change in capacitance by measuring the amount of charge that must be injected onto the sense line 16 to reestablish or regain balance on the sense line.

The touchpad 10 must make two complete measurement cycles for the X electrodes 12 and for the Y electrodes 14 (four complete measurements) in order to determine the position of a pointing object such as a finger. The steps are as follows for both the X 12 and the Y 14 electrodes:

First, a group of electrodes (say a select group of the X electrodes 12) are driven with a first signal from P, N generator 22 and a first measurement using mutual capacitance measurement device 26 is taken to determine the location of the largest signal. However, it is not possible from this one measurement to know whether the finger is on one side or the other of the closest electrode to the largest signal.

Next, shifting by one electrode to one side of the closest electrode, the group of electrodes is again driven with a signal. In other words, the electrode immediately to the one side of the group is added, while the electrode on the opposite side of the original group is no longer driven.

Third, the new group of electrodes is driven and a second measurement is taken.

Finally, using an equation that compares the magnitude of the two signals measured, the location of the finger is determined.

Accordingly, the touchpad 10 measures a change in capacitance in order to determine the location of a finger. All of this hardware and the methodology described above assume that the touchpad sensor control circuitry 20 is directly driving the electrodes 12, 14 of the touchpad 10. Thus, for a typical 12×16 electrode grid touchpad, there are a total of 28 pins (12+16=28) available from the touchpad sensor control circuitry 20 that are used to drive the electrodes 12, 14 of the electrode grid.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes on the same rows and columns, and other factors that are not material to the present invention.

Although the CIRQUE® touchpad described above uses a grid of X and Y electrodes and a separate and single sense electrode, the sense electrode can be eliminated and the function of the sense electrode is the set of electrodes not being used to drive a signal.

The method of using a single sense electrode has provided a very simple/low cost solution by requiring only a single Rx channel. The single sense line, however, creates measurements that are susceptible to noise even for measurement patterns not near a finger. The noise in the measurements for electrode patterns not near the finger cause the extraction method to falsely detect finger presses in random positions all over the surface which result in false positive gestures, cursor jitter and gesture state machine mode confusion manifesting in unresponsive cursor movement.

It is desirable to use the mutual capacitance technology of CIRQUE® Corporation in order to provide multi-touch capabilities. It would be an advantage to eliminate the sense line, use de-ghosting in order to determine the actual location of all the fingers, and modify the existing technology in order to reduce sensitivity to noise.

BRIEF SUMMARY OF THE INVENTION

The purpose of the present invention is to decrease the cost of a touchpad by avoiding the cost of simultaneously measuring all signals from sense electrodes by using a limited number of measuring circuits to accomplish noise reduction and de-ghosting of signal data to thereby obtain the precise location of multiple fingers on a touchpad, wherein the touchpad separates the drive electrodes into groups to thereby provide a means for obtaining granular location information for de-ghosting the touchpad, and wherein overlapping measurements are made of groups of sense electrodes to obtain data that is separated in time to thereby obtain an averaged signal for each electrode and thereby reduce sensitivity to noise.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

The present invention is a system of orthogonal electrode grids disposed in two parallel planes of X and Y electrodes. The X and Y electrodes alternate functioning as drive electrodes and sense electrodes in order to determine the location of one or more objects on a touch sensitive surface. The drive electrodes receive drive signals for stimulating the touch sensor. The sense electrodes receive sense signals that are indicative of the presence of a finger or other detectable pointing object. Accordingly, when the X electrodes (or electrodes on the X axis) are functioning as drive electrodes, the Y electrodes (or electrodes on the Y axis) function as sense electrodes. After the measurements are taken, the functions of the electrodes are reversed such that the X electrodes function as sense electrodes while the Y electrodes function as drive electrodes.

The electrode grids of the present invention can be used in touch sensor applications which include both touchpad and touch screen designs. It should also be understood that the present invention uses mutual capacitance to detect a decrease in capacitance between drive electrodes and sense electrodes caused by the introduction of one or more conductive objects such as fingers into the sensing area of the electrode grids.

Figure 2:
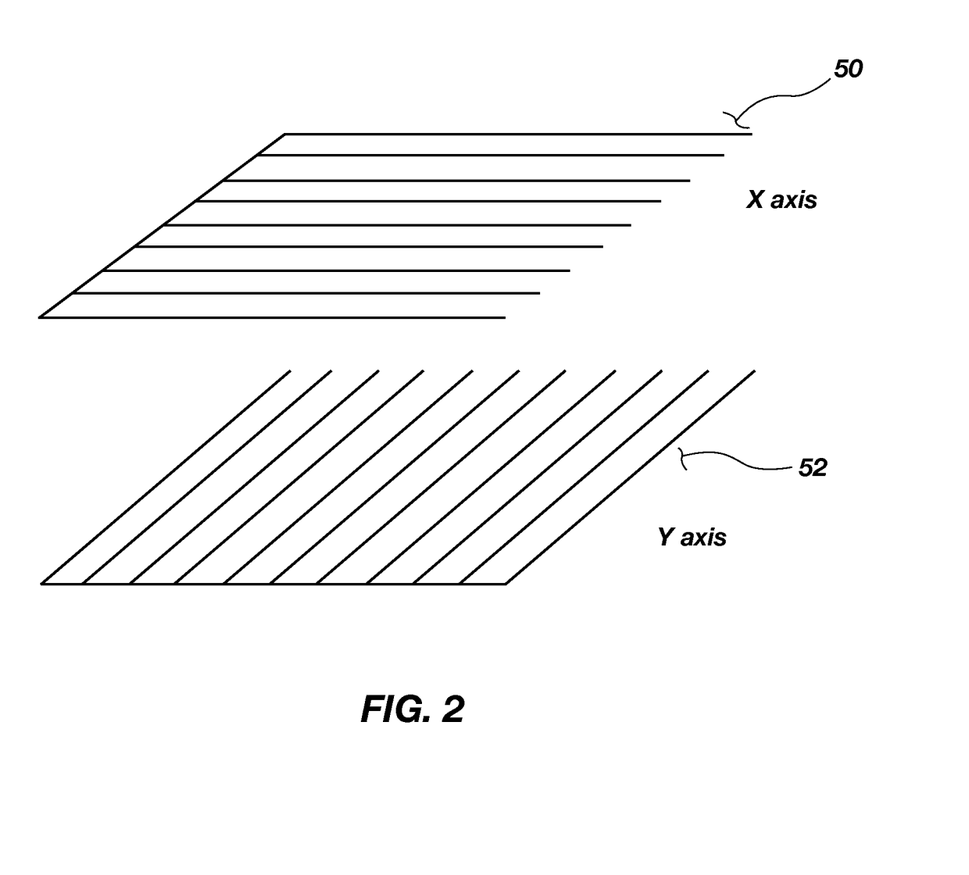
FIG. 2 is a perspective view of a plane of X electrodes and a plane of Y electrodes.

FIG. 2 is a perspective view of a plurality of X electrodes 50 in a first, plane and a plurality of Y electrodes 52 in a second plane, wherein the electrodes are arranged so as to be orthogonal but parallel to each other. The X electrodes 50 are defined as being in a first axis, and the Y electrodes 52 as being in a second and orthogonal Y axis relative to the first or X axis. The specific number of electrodes 50, 52 in each axis is shown for illustration purposes only, and should not be considered a limiting factor of the design. The X electrodes 50 and the Y electrodes 52 are shown spaced apart from each other for illustration purposes only to demonstrate the physical relationship of the electrodes with one set of electrodes disposed above the other.

Figure 3A:
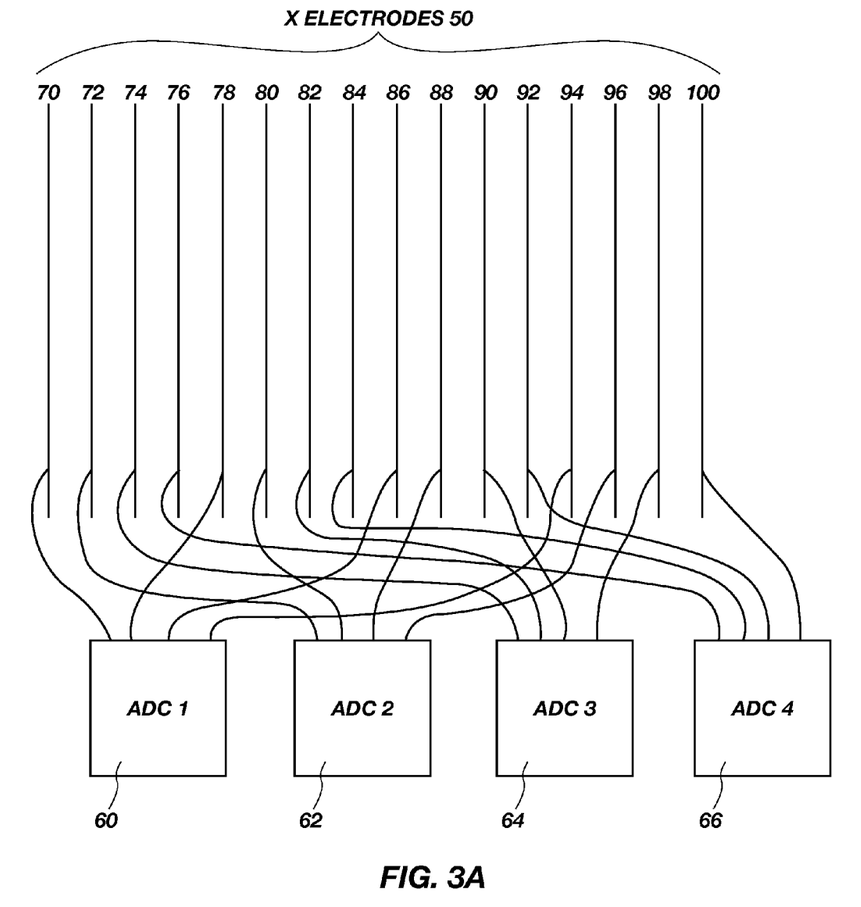
FIG. 3A is a block diagram view of a set of sixteen X electrodes and the ADC channels that are coupled to whichever electrodes are acting as the sense electrodes, in groups of four.

FIG. 3A is a block diagram view of a single set of electrodes. Thus, these electrodes could be the X electrodes 50 or the Y electrodes, along with accompanying sensor circuitry for measuring signals on whichever set of electrodes are functioning as the sense electrodes. The present invention uses four Analog-to-Digital Converters (ADCs or ADC channels) 60, 62, 64, 66 to measure signals from the electrodes being used as the sense lines. In this embodiment, a maximum of four electrodes are coupled to each ADC channel 60, 62, 64, 66. For a typical touchpad of 12×16 electrodes, a total of four ADC channels 60, 62, 64, 66 are thus required when the 16 electrodes are being measured, but only three ADC channels are used when measuring the signals from the 12 electrodes. If more electrodes are being used such that there are more than 16 electrodes in a single X or Y electrode array, then mare ADC channels should be provided so that the maximum number of electrodes per ADC does not exceed four.

It should be noted that the use of four ADC channels is done for more than just the purpose of reducing the cost of the touchpad sense circuitry. In other words, it would be possible to use an ADC on each of the sense lines. However, the cost of the touchpad sense circuitry would be substantially higher. Therefore, even though there is a cost savings by only using four ADC channels, it will be explained that the need to share ADC channels comes with another benefit to touchpad operation in multi-touch applications.

It is also noted that while it is useful to divide the sense electrodes into groups, the number of electrodes in each of the groups can be adjusted, and should not be considered to be a limiting factor of the invention as long as the maximum number of electrodes coupled to any of the ADC channels is the same.

This document will now explain how the ADC channels can be used to reduce noise from the measurements being taken from the sense electrodes. This system and method works for a single finger or multiple fingers. It will be assumed for this example that there are four ADC channels 60, 62, 64, 66 for taking measurements from whichever electrodes are being used as the sense electrodes. It is also assumed that there are 16 X electrodes and 12 Y electrodes in this embodiment of the present invention. This assignment of electrodes to an X or Y group is arbitrary. The total number of electrodes in either the X or Y grids should not be considered a limiting factor and is for illustration purposes only.

The Y electrodes 52 are randomly selected to first be the drive electrodes. Accordingly, there are 16 X electrodes 50 that are functioning as the sense electrodes. Using an ADC with at least four selectable inputs (shown) or alternatively using an ADC that has a selectable input or inputs such as a switch, the X electrodes 50 are sequentially coupled to the four ADC channels 60, 62, 64, 66 in groups of four. Thus, the first X electrode 70 is coupled to ADC channel 60, the second electrode 72 is coupled to ADC channel 62, the third electrode 74 is coupled to ADC channel 64, and the fourth electrode 76 is coupled to ADC channel 66. After measurements are taken for the electrodes 70, 72, 74, 76, then the ADC channels are configured for taking measurements from the next four electrodes 78, 80, 82, 84. The measurement sequence is repeated with the first electrode 78 being coupled to ADC channel 60, the second electrode 80 coupled to ADC channel 62, and so on for this group of four sense electrodes. The sequence is repeated for each group of four electrodes until a measurement has been taken from all the sense electrodes.

If there are more ADC channels than electrodes in the final group, the measurements are taken using whichever ADC channels are needed.

In a first embodiment for reducing noise, measurements are taken and averaged over a short period of time. Thus, while the Y electrodes 52 are being driven with a signal, the four ADC channels 60, 62, 64, 66 are coupled to the first four X electrodes 70, 72, 74, 76. However, instead of shifting to a completely new set of four electrodes, the four ADC channels 60, 62, 64, 66 are only shifted to include two new electrodes and two previously measured electrodes. Thus, the next measurements are taken from electrodes 74, 76, 78 and 80. After these next four electrodes are measured, the next step is to average the signals for the two electrodes that are overlapping from these first two sets of measurements, namely electrodes 74 and 76. The electrodes coupled to the four ADC channels 60, 62, 64, 66 are again shifted by two, resulting in the ADC channels being coupled to electrodes 78, 80, 82, 84. The next step is to average the signals from the electrodes that are overlapping from the two previous measurements, namely electrodes 78 and 80.

This process of shifting the four ADC channels 60, 62, 64, 66 and taking overlapping measurements continues until reaching X electrodes 94, 96, 98 and 100 where the measurement for electrodes 94 and 96 are averaged with the previous measurement cycle when electrodes 90, 92, 94 and 96 were measured. However, it should be apparent that there is still no averaged measurement that includes electrodes 98, 100, 70 and 72. Therefore, to complete the measurements for the entire array of X electrodes 50, the last measurement cycle is to take a measurement of electrodes 98, 100, 70 and 72, and then average the measurement for electrodes 98 and 100 from the immediately preceding measurement cycle, and for electrodes 70 and 72 from the first measurement cycle. Accordingly, the sensor circuitry will include memory that is sufficient to record the necessary measurements so that averaging can be completed for all the sense electrodes.

To make one complete measurement of all 16 X electrodes 50 requires taking measurements for a total of eight measurement cycles. Then the process is switched wherein the X electrodes 50 become the drive electrodes and the Y electrodes 52 become the sense electrodes. To make one complete measurement of all the Y electrodes 52 requires taking measurements for a total of six measurement cycles. These measurement cycles are not a limiting factor, and are used for illustration purposes only.

The feature of the present invention above is directed to noise reduction in a first embodiment of the present invention. Noise is reduced by taking two measurements per electrode and averaging the results. The present invention is capable of reducing the effect of noise by averaging the measurement results of each electrode.

In an alternative noise reduction embodiment of the present invention, a different method of noise reduction is possible when using multiple ADC channels. This alternative method is referred to in this document as stitching. Stitching is accomplished by performing calculations on the overlapping electrode measurement data. Specifically it is noted that if a finger is on the touchpad, it is not considered to be moving when compared to the high speed at which two sequential overlapping measurements can be taken. If there is no noise in the system, the results from the two overlapping measurements will be the same. However, if there is noise in the system, there may be some offset between the first set of measurements and the second set.

This offset is found by subtracting the overlapping measurement results for a particular electrode, and then subtracting this offset amount from all the ADC results for that measurement. This can be repeated for every measurement set across the sensor axis.

Figure 3B:
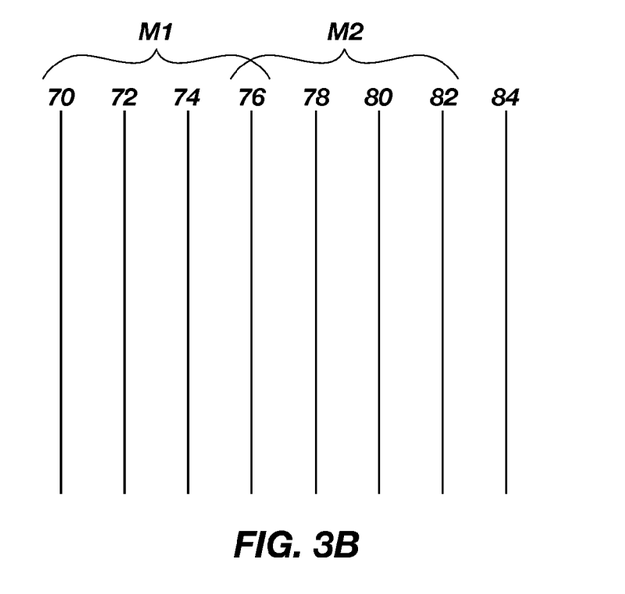
FIG. 3B is a subset of the X electrodes shown in FIG. 3A, for the purpose of showing how to overlap electrodes to obtain an offset that can be subtracted from measurement results to obtain more reliable results of finger location data.

This first example is shown in FIG. 3B, which is a subset of the X electrodes shown in FIG. 3A, and uses a single overlapping electrode measurement. The purpose of this alternative embodiment is to subtract the noise instead of just averaging results. For example, if the first measurement results consisted of M1(70) (measurement one, electrode 70), M1(72), M1(74), M1(76) that correspond to four ADC channels assigned to X sense electrode 70, 72, 74, 76 and if the second measurement consisted of M2(76), M2(78), M2(80), M2(82) that corresponded to four ADC channels assigned to sense electrodes 76, 78, 80, 82, then we obtain an offset from the sense electrode that is in both sets of measurements, which is sense electrode 76. The offset is just the measurement from one set of measurements subtracted from the measurement from the other set. If there is no noise on the system, then the offset value will be zero. If there is noise, then there will be some value that will then be subtracted from all the measurements. Assuming that the offset is M2(76) minus M1(76), the following normalization equations are applied:

$$Offset = M2(76) - M1(76)$$

The corrected measurements (MC) would be:

$$MC2(76) = M2(76) - Offset = MC1(76)$$

$$MC2(78) = M2(78) - Offset$$

$$MC2(80) = M2(80) - Offset$$

$$MC2(82) = M2(82) - Offset$$

Figure 3C:
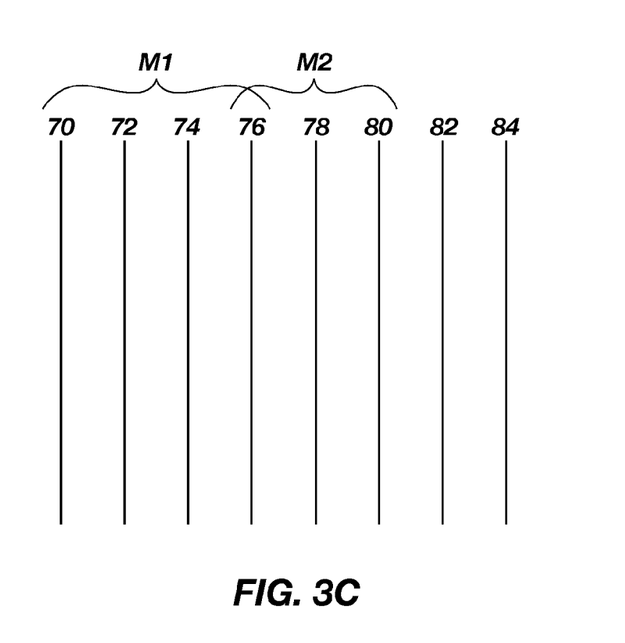
FIG. 3C is a subset of the X electrodes shown in FIG. 3A, for the purpose of showing multiple overlapping electrodes to further improve the reliability of calculations by removing noise from measurements results.

The example above has an overlap of one ADC channel. However, this method can be applied to two three or any number of overlapping electrode measurements. For example, if there are two overlapping sense electrodes as shown in FIG. 3C, then the noise that is present on two different electrodes can be averaged to thereby improve the accuracy of the method. Using the sense electrodes shown in FIG. 3C, the offset would calculated as follows:

Offset1=M2(74)−M1(74)

Offset2=M2(76)−M1(76)

Average Offset=(Offset1+Offset2)/2

This Average Offset would then be subtracted from the second measurements M2 to obtain corrected measurements MC2. The sequence of moving two electrodes forward and determining a new offset continues until all electrodes have a corrected measurement value. While the accuracy of the system is improved, the tradeoff is a decrease in overall speed of the system if more and more electrodes are overlapped to obtain an averaged correction offset.

There may be some non-linearities in the ADC signal paths or in the transfer functions where a simple subtraction of ADC results may not be accurate. Other math functions may be required to normalize each set of ADC channel measurements while still using the overlapping ADC channel results as references to normalize the measurement sets.

The next feature of the present invention is directed to the issue of de-ghosting. The ghosting effect is the undesirable phenomenon that occurs in a mutual capacitance sensitive touchpad wherein it is impossible, without further analysis, to determine the location of conductive objects on the touchpad surface when there are multiple objects. In effect, two objects will appear to be present on the touchpad for every real object that is actually present.

Figure 4A:
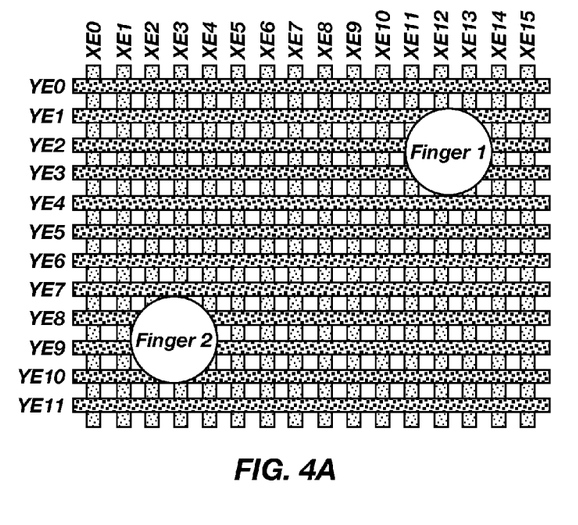
FIGS. 4A-4F illustrate the problem of ghosting in a mutual capacitance touchpad.
Figure 4B:
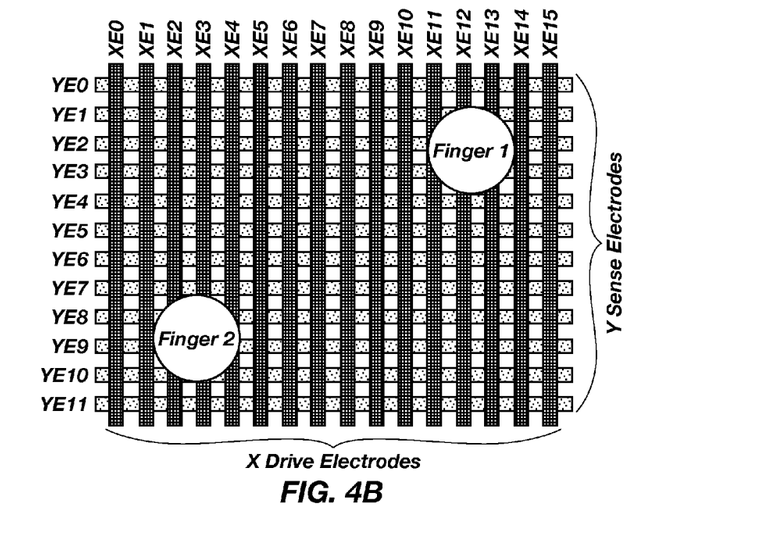

The problem of the prior art is explained using FIGS. 4A through 4F. In FIG. 4A, a first finger is located at Finger 1, and a second finger is located at Finger 2. Measurements are now taken to determine the locations of the fingers according to measured values. In FIG. 4B, the X electrodes are the drive electrodes that are all driven in phase at the same time and the Y electrodes are the sense electrodes. The graph at FIG. 4O shows that two objects 110, 112 are detected in the Y axis, as indicated by the large signal in two different locations.

Figure 4C:
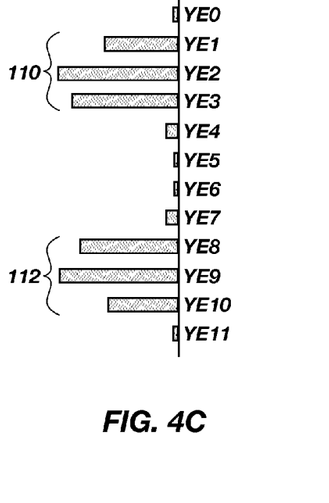
Figure 4D:
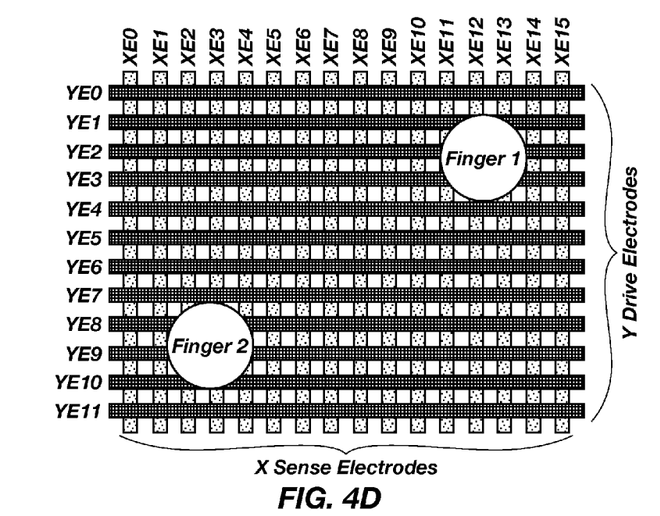

In FIG. 4D, the X electrodes are now the sense electrodes, and the Y electrodes are the drive electrodes. The graph at FIG. 4E shows that two objects 114, 116 are detected in the X axis.

Figure 4E:
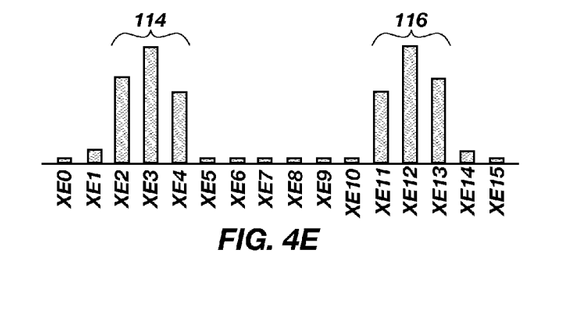
Figure 4F:
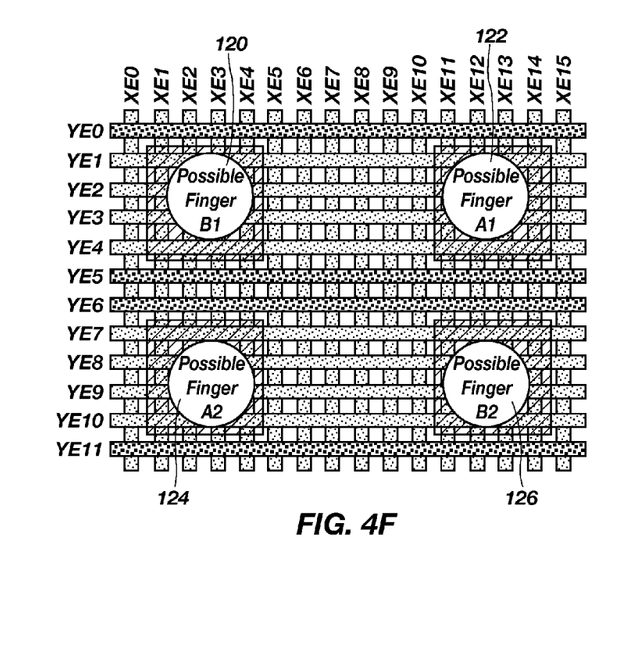

The problem of ghosting is demonstrated by combining the sense data from the graphs in FIGS. 4C and 4E. FIG. 4F shows that there are four possible locations 120, 122, 124, 126 for the two fingers to be located. It is not possible to tell from the raw sense data where the two fingers are actually located. The fingers could be at A1/A2 or at B1/B2. This data is collected by assuming that all the sense electrodes are being measured almost simultaneously, according to the eight measurement cycles and six measurement cycles described previously.

The present invention solves the problem of ghosting, or determining in which of the possible finger locations the fingers are actually located, using what is referred to as granular location information. In other words, by breaking up the drive electrodes into groups, it is then possible to determine in which groups the fingers are actually located. In other words, this is the advantage that is obtained by measuring the electrodes in groups because of the limited number of ADC channels.

Figure 5A:
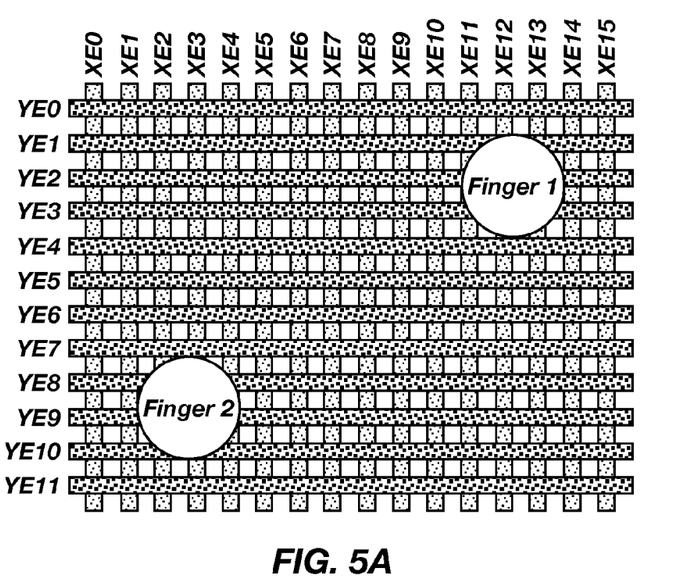
FIGS. 5A-5K illustrate how the drive electrodes are separated into groups in order to create granular location information for determining the location of fingers by eliminating ghost images of fingers.
Figure 5B:
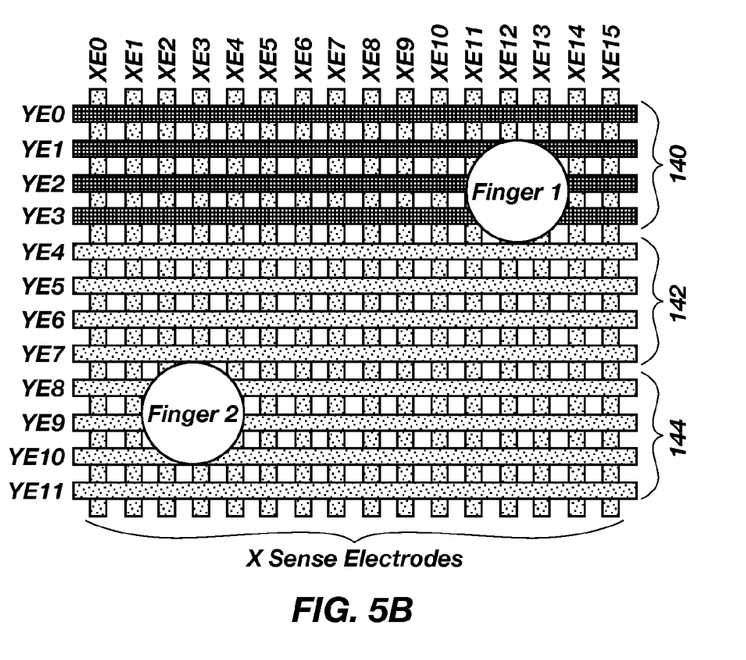
Figure 5C:
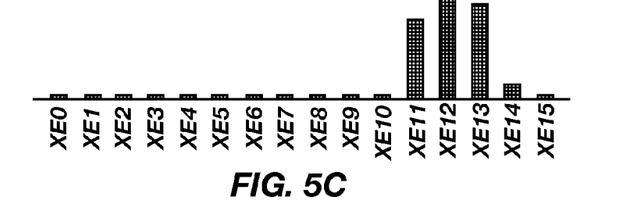
Figure 5D:
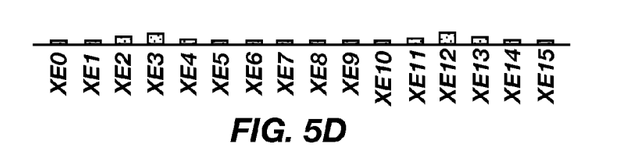
Figure 5E:
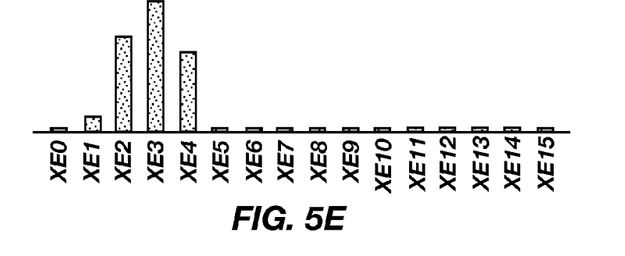

Consider now the touchpad in FIG. 5A with the fingers at Finger 1 and Finger 2. Arbitrarily selecting to drive the Y electrodes first, the Y electrodes are separated into three groups 140, 142, 144 of four electrodes each as shown in FIG. 5B. The graph at FIG. 5C is a profile image of what is being detected on the sense electrodes, which in this example are the X electrodes, when the first group 140 of the Y electrodes is being driven. The graph at FIG. 5D shows what is measured on all the X electrodes when the second group 142 of the Y electrodes is being driven. Finally, the graph at FIG. 5E shows what is measured on all the X electrodes when the third group 144 of the Y electrodes is being driven. It is observed that a finger appears in the graphs in FIGS. 5C and 5E. The graphs shown in FIGS. 5C through 5E are each a snapshot or profile image of what is being detected on the sense electrodes when a particular group of drive electrodes are being stimulated.

Figure 5F:
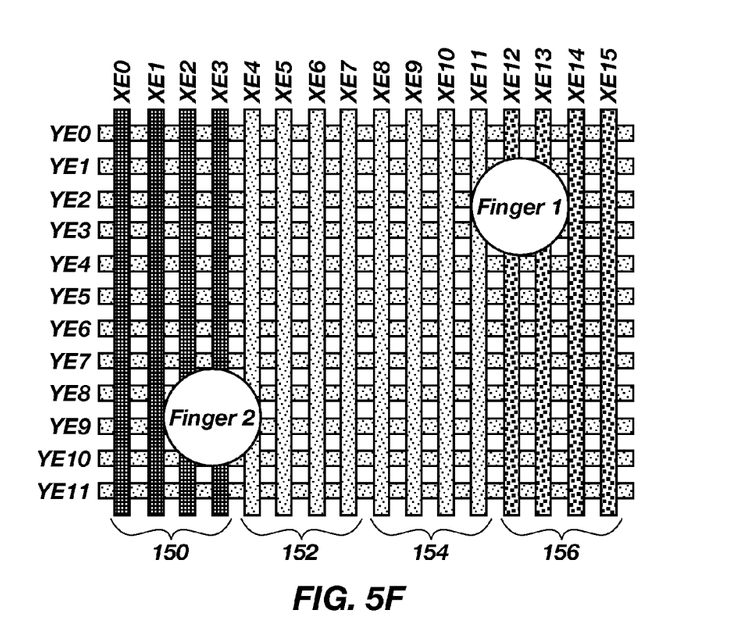
Figure 5G:
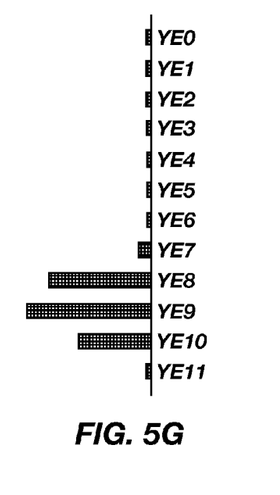
Figure 5H:
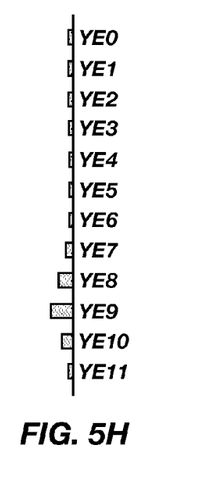
Figure 5I:
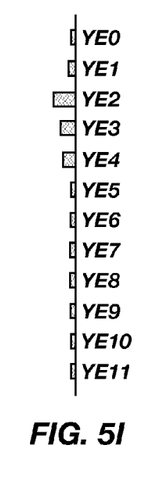
Figure 5J:
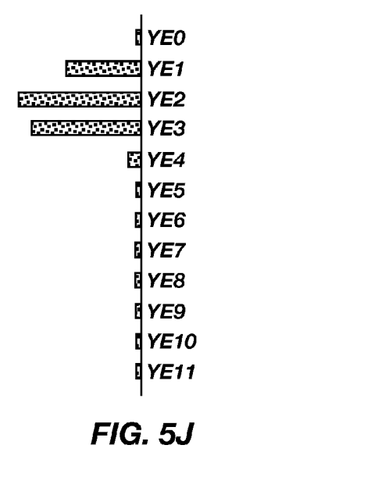

The next step is to drive the X electrodes in four separate groups 150, 152, 154, 156 of four electrodes as shown in FIG. 5F. The graph at FIG. 5G shows what is measured on all the Y electrodes when the first group 150 of the X electrodes is being driven. The graph at FIG. 5H snows what is measured on all the Y electrodes when the second group 152 of the X electrodes is being driven. The graph at FIG. 5I shows what is measured on all the Y electrodes when the third group 154 of the X electrodes is being driven. Finally, the graph at FIG. 5J shows what is measured on all the Y electrodes when the fourth and final group 156 of the X electrodes is being driven.

Figure 5K:
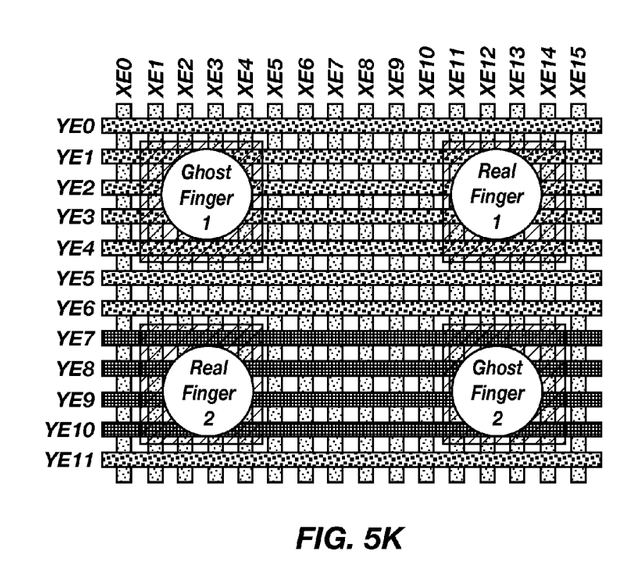

FIG. 5K shows all the measurement data combined in a single touchpad, as well as the corresponding FIGS. 5C through 5E and 5G through 5J. This figure shows which fingers are actually present and which fingers are ghost images, with the fingers at Real Finger 1 and Real Finger 2. This conclusion is reached by matching finger measurements identified in the graphs in FIGS. 5C through 5E to the finger measurements identified in the graphs in FIGS. 5G through 5J. In other words, the fingers are identifiable by dividing the drive electrodes into smaller groups which enables the data from one electrode grid to be matched against the data of the other electrode grid to determine which fingers are really present. Thus, the data has been de-ghosted by dividing the drive electrodes into smaller groups.

Using the information in FIGS. 5C through 5E and in 5G through 5J, the finger found in FIG. 5C is from group 140. The finger found in FIG. 5J is from the group 156. The electrodes in group 140 and group 156 only overlap in one location, which is the granular location of finger 1.

Similarly, the finger found in FIG. 5E is from group 144, and the finger found in FIG. 5G is from the group 150. The electrodes in group 144 and group 150 only overlap in one location, which is the granular location of finger 2. In other words, it is necessary to determine where drive electrode groups physically overlap each other when the profile image for each drive electrode group indicates that a finger may be present. Real Finger 1 is therefore located as follows. FIG. 5J is a profile image for drive electrode group 140 which indicates that a finger is present. FIG. 5C is a profile image for drive electrode group 156 which indicates that a finger is present. By physically overlapping drive electrode group 140 and drive electrode group 156, they overlap in one area of the touch sensor. This area is where the real finger 1 is located, and therefore information from that location is tracked.

In an exact same method, Real Finger 2 is also located by overlapping drive electrode group 144 and drive electrode group 150 which are both identified as having an object present because of the profile images from FIGS. 5E and 5G. It should be understood that the touchpad of the present invention includes all necessary drive circuitry for transmitting drive signals to the drive electrodes in order to stimulate the touchpad so that objects can be detected on and/or above its surface. The touchpad also includes sensor circuitry for receiving sense signals from the sense electrodes, and a processor for processing the sense signals and generating profile images from the data that is received.

An important aspect to consider is that the groups of drive electrodes can be made larger or smaller depending upon the circumstances. For example, if the electrodes are relatively close together, the number of electrodes in each group can be larger. A larger group would also require more ADC channels to be used, one for each electrode in the group. Likewise, if the electrodes are relatively far apart, the number of electrodes in each group must be fewer. The important thing to remember is that it is important that the width of the regions or quadrants defined by the groups of electrodes that are being measured at the same time are preferably only large enough to allow a single finger to be present within that region. The reason for this preference is that only a single finger can be detected within a region having a width that is defined by a single group of electrodes. This fact is used to refer to the data as "granular" location data for a finger. The system will only detect the presence of a single finger within a particular group of electrodes.

Another aspect of the present invention is that the number of electrodes within each of the drive electrode groups should be adjustable in order to compensate for small objects or small fingers being used to interact with the touchpad.

It should also be apparent that assigning the drive electrodes into groups in order to collect granular location data is not related to the issue of noise reduction in the touchpad. Taking multiple overlapping measurements of groups of electrodes enables a running average to be determined from multiple measurements of the same electrodes, as long as the measurements are separated by time.

It is noted that if it were possible to measure all of the sense electrodes simultaneously, it would be possible to obtain noiseless and de-ghosted data. However, it would also require an ADC channel to be dedicated to each electrode of the touchpad, and thus increasing the cost of the touchpad significantly. By using a limited number of ADC channels to take measurements, the cost of the touchpad is reduced. Noise is reduced by taking overlapping measurements separated by time. Further noise reduction improvements are obtained if noise is subtracted from the measurements by using overlapping electrodes to obtain an offset. By dividing the drive electrodes into groups to thereby create regions that are only wide enough for a single finger to be present, it is possible to de-ghost the data and determine which measurements are actually showing the presence of a finger or other conductive object.

Some prior art multi-touch capacitance systems available today drive one electrode at a time on only one axis and sense on the other axis. This method is used to address every electrode cross-over. If simultaneous measurements are taken on the sense axis, noise should be common to all the ADC channels for each measurement and can be subtracted out. However the noise from measurement to measurement may vary which results in position uncertainty in the drive axis. Accordingly, it is another aspect of the present invention to reduce noise by alternating the axes that are being used as the drive and sense electrodes. In other words, because the sense axis has high noise immunity, it is advantageous to make finger position calculations using data from the sense axis. The present invention can use multiplexors to switch the ADC channels from one axis to another. Alternatively, if an ADC channel is provided for every electrode, it would then be possible to switch each electrode between the drive function and the sense function as desired.

For touchpads that drive each electrode one at a time on one axis and sense electrodes on the other axis, there is a measurement result for each X-Y crossover junction. This resulting data array is an "image" of the touching objects on the touchpad. The data array size is the number of X electrodes multiplied by the number of Y electrodes (data array size=Xn*Ym). It is desirable to store and compensate less data. One way is to add the results of all the measurements for each axis. This collapsed data array gives a "profile" of the touching objects on the touchpad. The number of measurement results in the array is the number of X electrodes plus the number of Y electrodes (data array size=Xn+Ym). An alternative method is to drive all the electrodes in one axis at the same time which gives the same "profile" data array for the sense axis.

A last issue that needs to be addressed in the present invention is determining the location, the precise centroid or center of gravity of each individual finger that is present on the touchpad. In the present invention, slope detection data is used to determine the position of each finger.

Figure 6:
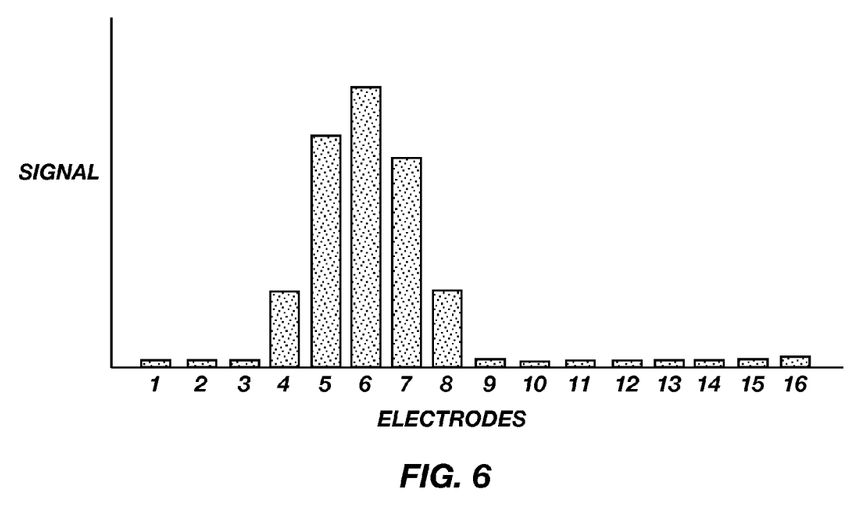
FIG. 6 shows measurement data from sense electrodes that are used to determine the centroid of a conductive object on the touchpad.

Consider a graph as shown in FIG. 6. FIG. 6 shows data from a single set of electrodes, such as either the X or the Y electrodes. For example, this data could be collected from 16 X electrodes. The data could also represent data from a plurality of Y electrodes, and is for illustration purposes only.

The present invention determines the boundaries of each finger. This is accomplished by detecting a signal that crosses an initial threshold value. Data is collected showing the magnitude of signal for each electrode until the signal crosses below the threshold value, the edge electrode on the touchpad is reached, or some condition is met that means that the signal is no longer decreasing. This means that the signal has bottomed out and is level, an edge of the touchpad is reached, or the signal is beginning to increase again because another finger is detected.

In FIG. 6, a signal is found on electrodes 4, 5, 6, 7 and 8. It is noted that the highest signal or maxima of the signals is not considered to be the location of the finger, the centroid, or the center of gravity. Those skilled in the art understand that determining a weighted average of the magnitudes from the electrodes can be used to determine the precise location of the finger.

Thus, determining the location of a finger is not accomplished by locating the maxima and minima data from the measurements, but instead is determined by finding the boundaries of the finger, and then determining a weighted average from the measurements within the boundaries.

It is to be understood that the above-described arrangements are only illustrative of the application of the principles of the present invention. Numerous modifications and alternative arrangements may be devised by those skilled in the art without departing from the sprit and scope of the present invention. The appended claims are intended to cover such modifications and arrangements.

What is claimed is:

1. A method for reducing noise in measurements used to determine a location of at least one finger on a touch sensor, said method comprised of the steps of:

1) providing a touch sensor having a first electrode axis which is orthogonal to but co-planar with a second electrode axis, wherein each of the electrode axes are comprised of a plurality of parallel electrodes, wherein the touch sensor receives sense signals on the axis that is selected to function as sense electrodes;

2) selecting a first set of contiguous sense electrodes and measuring a first set sense signal from each of the electrodes in the first set;

3) selecting a second set of contiguous sense electrodes and measuring a second set sense signal from each of the electrodes in the second set, wherein there are at least two overlapping sense electrodes that belongs to the first set and the second set, 4) subtracting the first set sense signal from the second set sense signal to create an offset for each of the at least two sense electrodes, averaging all of the offsets, and subtracting the average offset from the second set sense signal for each electrode in the second set;

5) calculating a corrected sense measurement for the at least two overlapping sense electrodes that compensate for noise by using the sense signal from the first and second set sense signals; and 6) using the corrected sense measurements to determine a location of the at least one finger on the touch sensor.

2. The method as defined in claim 1 wherein the method further comprises the steps of:

1) subtracting the first set sense signal from the second set sense signal to create an offset; and 2) subtracting the offset from the second set sense signal for each electrode in the second set.

3. The method as defined in claim 1 wherein the method further comprises the steps of:

1) selecting a new first set of contiguous sense electrodes that includes at least two sense electrodes from the previous second set of contiguous sense electrodes;

2) selecting a new second set of contiguous sense electrodes that includes at least two sense electrodes from the new first set of contiguous sense electrodes;

3) perform step 4 of claim 1 using the new sets of electrodes above; and 4) continue the selection of new sets of contiguous sense electrodes until a corrected sense measurement is obtained for each of the sense electrodes.

4. A system for reducing noise in measurements used to determine a location of at least one finger on a touch sensor, said system comprised of:

a first electrode axis which is orthogonal to but co-planar with a second electrode axis, wherein each of the electrode axes are comprised of a plurality of parallel electrodes, wherein the touch sensor receives sense signals on the axis that is selected to function as sense electrodes;

at least two Analog-to-Digital Converters (ADC channels) for receiving sense signals from whichever of the first or second electrode axes is functioning as the sense electrodes;

a switch for coupling a first set of contiguous sense electrodes to the ADC channels, one electrode for each ADC channel, and measuring a first set sense signal from each of the electrodes in the first set;

the switch for coupling a second set of contiguous sense electrodes and measuring a second set sense signal from each of the electrodes in the second set, wherein there is at least one overlapping sense electrode that belongs to the first set and the second set; and a processor for calculating a corrected sense measurement for the at least one overlapping sense electrode that compensates for noise by using the sense signal from the first and second set sense signals and using the corrected sense measurements to determine a location of the at least two fingers on the touch sensor.

* * * * *